United States Patent [19]
Bills et al.

[11] Patent Number: 5,887,931
[45] Date of Patent: *Mar. 30, 1999

[54] BED LINER WITH GRAPHICS DISPLAY

[75] Inventors: Dennis Bills, Lapeer; Don Williamson, Flint; John Carpenter, Davison, all of Mich.

[73] Assignee: The Colonel's, Inc., Milan, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 768,911

[22] Filed: Dec. 17, 1996

[51] Int. Cl.⁶ .................................................. B60R 13/01
[52] U.S. Cl. .......................... 296/39.1; 296/39.2; 40/591; 40/616
[58] Field of Search .................. 291/39.1, 39.2, 291/97.23, 213; 52/717.03, 716.5; 40/591, 200, 209

[56] References Cited

U.S. PATENT DOCUMENTS

| | | | |
|---|---|---|---|
| 2,057,873 | 10/1936 | Atwood | 296/97.23 X |
| 4,111,481 | 9/1978 | Nix et al. | 296/39.2 |
| 4,154,504 | 5/1979 | Mohs | 40/591 X |
| 4,572,568 | 2/1986 | Kapp et al. | 296/39.2 |
| 4,863,238 | 9/1989 | Brewster | 40/594 X |
| 4,930,279 | 6/1990 | Bart | 296/213 |
| 4,936,625 | 6/1990 | Pickard et al. | 296/39.2 |
| 4,944,612 | 7/1990 | Abstetar et al. | 296/97.23 X |
| 4,974,895 | 12/1990 | Davenport | 296/39.2 |
| 5,000,503 | 3/1991 | Bernatek | 296/39.2 |
| 5,083,830 | 1/1992 | Muchor et al. | 40/591 X |
| 5,165,747 | 11/1992 | Stringer et al. | 296/41 |
| 5,169,201 | 12/1992 | Gower | 296/39.2 |
| 5,240,301 | 8/1993 | Arnold | 296/39.2 |
| 5,308,133 | 5/1994 | Mangum et al. | 296/39.2 |
| 5,370,436 | 12/1994 | Martindale et al. | 296/39.2 |
| 5,372,397 | 12/1994 | Arndt | 296/39.2 |
| 5,556,151 | 9/1996 | New et al. | 296/39.2 |
| 5,673,960 | 10/1997 | Sorenson | 296/39.1 X |

FOREIGN PATENT DOCUMENTS

| | | | |
|---|---|---|---|
| 652979 | 3/1929 | France | 40/209 |
| 2686556 | 7/1993 | France | 40/200 |

OTHER PUBLICATIONS

J.C. Whitney & Co., Catalog 581E, Aug. 1995, p. 106 "Full Coverage 1 P.C. Bed Protector".

*Primary Examiner*—Dennis H. Pedder
*Attorney, Agent, or Firm*—Gifford, Krass, Groh, Sprinkle, Anderson & Citkowski, P.C.

[57] ABSTRACT

A protective liner for a truck bed of a pickup truck. The liner includes a front wall having an indicia mounting portion. The indicia mounting portion includes a frame surrounding the mounting surface dimensioned for mounting of a conventional sized license plate. The mounting surface may include graphics or lettering which is formed to protrude inwardly towards the cab of the vehicle to facilitate mounting. The liner also includes friction strips positioned between the ribs of the floor to provide friction to keep cargo from sliding about the floor. Finally, a molding for attaching the tailgate panel to the tailgate has a pair of arms for slidably receiving the panel and a flange to protect an adhesive strip from contamination.

5 Claims, 2 Drawing Sheets

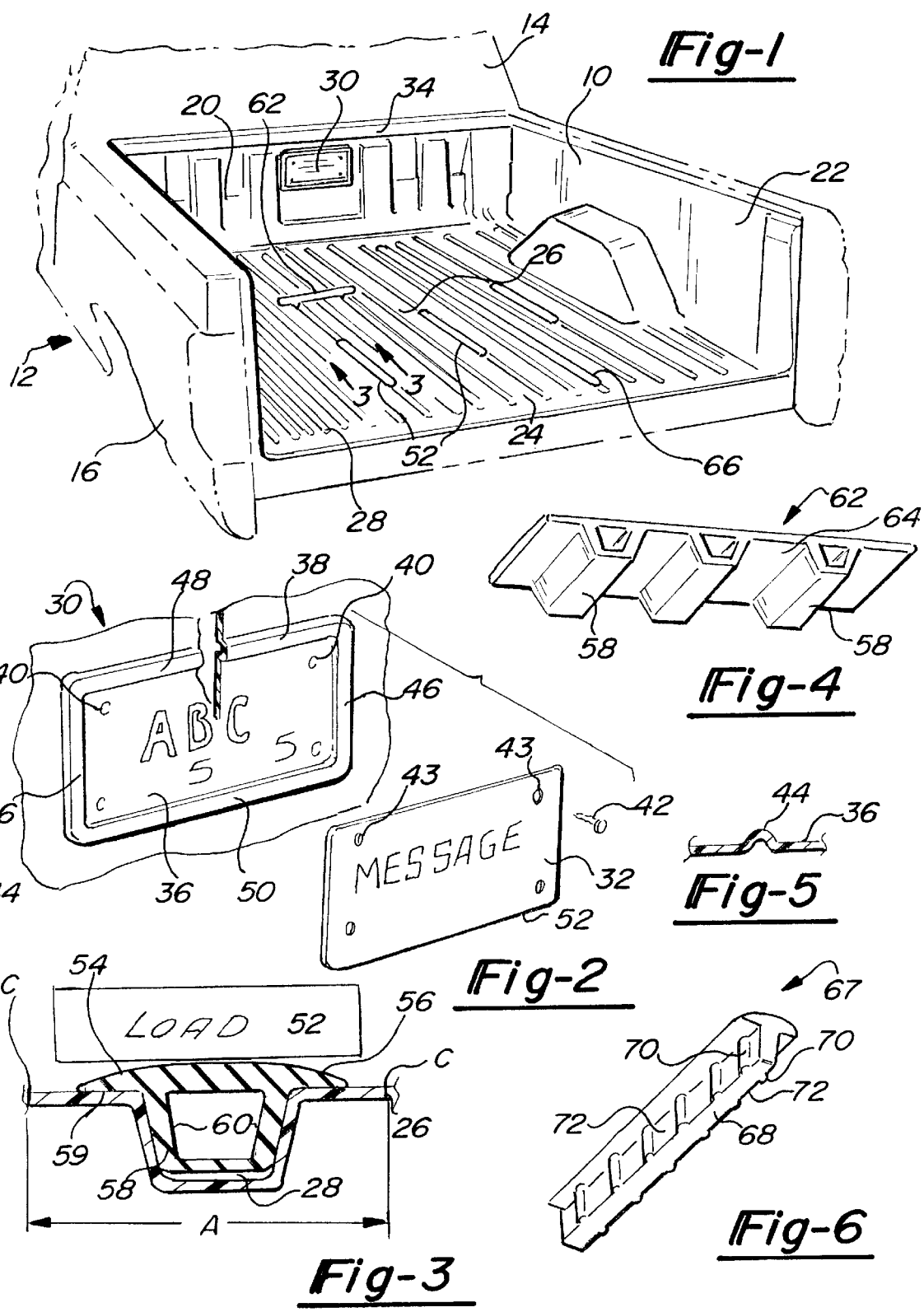

BED LINER WITH GRAPHICS DISPLAY

BACKGROUND OF THE INVENTION

I. Field of the Invention

The present invention relates to bed liners for pickup trucks and, more particularly, to a bed liner having a graphics display.

II. Description of the Prior Art

Protective liners for the cargo areas of vehicles such as pickup trucks are well known. These liners protect the finish of the sheet metal from damage occurring during transportation of cargo. The liner typically has a bottom wall, a pair of side walls, and a front wall which are formed to conform with the slope of the truck bed by vacuum molding. The liners are either formed with top flanges to extend "over-the-rail" of the truck bed as disclosed in U.S. Pat. No. 4,111,481, or without flanges so that they may be disposed under the rail, such as disclosed in U.S. Pat. No. 4,592,583. Typically, the bottom floor is ribbed to provide strength and facilitate drainage of rain water. Generally, a separate rectangular panel is mounted by screws to the tailgate of the truck, such as disclosed in U.S. Pat. No. 5,372,397. Previously known liners have suffered from a number of drawbacks.

Recently, it has become a custom to affix the name of the manufacturer, vehicle, or dealership in the front wall of the truck bed liner, such as disclosed in U.S. Pat. No. 5,308,133. The name or logo of the manufacturer of the vehicle or bed liner is molded into the bed liner. The letters or graphics extend outwardly away from the front wall toward the rear of the vehicle. Recently, "private label" liners bearing the name or logo of the dealer have been produced. The name or indicia of the dealer is molded into the liner in the location where the indicia of the manufacturer or vehicle maker is normally molded on the front wall. A specially formed mold portion, having the indicia of the manufacturer or the dealer, is substituted in the mold of the liner to form the indicia. However, such a procedure is time consuming and expensive. Moreover, it is very costly to maintain an inventory of all models of "private label" liners for each of the dealers.

There have been problems with ribbed floor bottoms. The top of the ribs of the floor of the bottom portion of the truck bed liner do not provide sufficient friction to keep cargo from sliding during turning and rapid acceleration and deceleration. Some manufacturers spray the liner with a coating which provides greater friction on the floor surface. However, bed liner material with this coating is not recyclable. Thus, scrap from the formation of the truck bed liners must be discarded and cannot be reused.

Finally, most of the materials used for forming the liners shrinks and expands with temperature changes. Panels screwed to the tailgate can frequently warp or distort. Additionally, some manufacturer's rust resistance warranties are voided when additional holes are drilled for the screws. Accordingly, it would be desirable to overcome these and other problems associated with truck bed liners.

It is, therefore, an object of the invention to provide a truck bed liner which has a portion formed in the front wall for the easy and economical installation of a manufacturer or dealer's name or logo.

It is also an object of the invention to provide a device for keeping cargo in the bed liner from sliding.

Finally, it is an object of the invention to provide an improved method of affixing the tailgate liner panel to the tailgate.

SUMMARY OF THE INVENTION

The present invention is a truck bed liner which has a front wall adapted to receive a separately formed indicia plate. Also disclosed is a friction strip insertable into the ribbed floor to hold cargo from sliding and extrusion strips for mounting tailgate panels. Finally, an expansion strip is provided to facilitate mounting of the tailgate panel.

The truck bed liner is formed with a front wall portion adapted for mounting the indicia plate. The indicia plate is the size and shape of a conventional vehicle license plate. The indicia plate is mounted to a rectangular mounting surface enclosed by a frame portion molded into the front wall. The frame portion has a U-shaped cross section and extends outwardly from the mounting surface. Dimples are positioned in the mounting surface for the easy insertion of fasteners to affix the indicia plate to the liner. The mounting surface is advantageously provided with lettering or graphics molded to extend towards the cab of the vehicle. In this way, the manufacturer's name may be formed on the mounting surface and the indicia plate bearing other indicia may be mounted to cover the mounting surface.

The friction strips are formed of synthetic rubber for insertion between the ribs of the floor. An upper portion spans portions of adjacent ribs and a plug portion extends downwardly to engage the ribs. The plug portion is formed to have a shape generally to be inserted in the grooves between the ribs of the liner bottom. The upper portion of the strip has a width no greater than the spacing between the longitudinal centers of two adjacent ribs so that additional strips may be mounted in the adjacent grooves. The upper portion forms a high friction surface for preventing the sliding of cargo within the liner under the cargo to hold the material within the truck bed liner.

An elongated panel edge holder is provided for slidingly mounting the tailgate panel. The panel holder is formed to extend transversely across the bottom of the tailgate and has a U-shaped groove to slidingly receive a bottom edge of the tailgate panel. The panel holder has an adhesive portion for mounting to the tailgate and a protective flange for keeping dirt and moisture from contacting the adhesive.

BRIEF DESCRIPTION OF THE DRAWING

FIG. 1 is a perspective view of a truck bed liner having an indicia mounting portion formed in the front wall and friction strips in accordance with the invention;

FIG. 2 is an exploded view of a portion of the indicia mounting portion and indicia plate in accordance with the invention;

FIG. 3 is a cross-sectional view of a friction strip taken along lines 3—3 of FIG. 1;

FIG. 4 is a perspective view of an alternative embodiment of a friction strip in accordance with the invention;

FIG. 5 is a cross-sectional view of a mounting surface as taken along lines 5—5 of FIG. 2;

FIG. 6 is a perspective view of a second alternative embodiment of a friction strip;

DETAILED DESCRIPTION OF THE PREFERRED EMBODIMENTS

Figure 7:
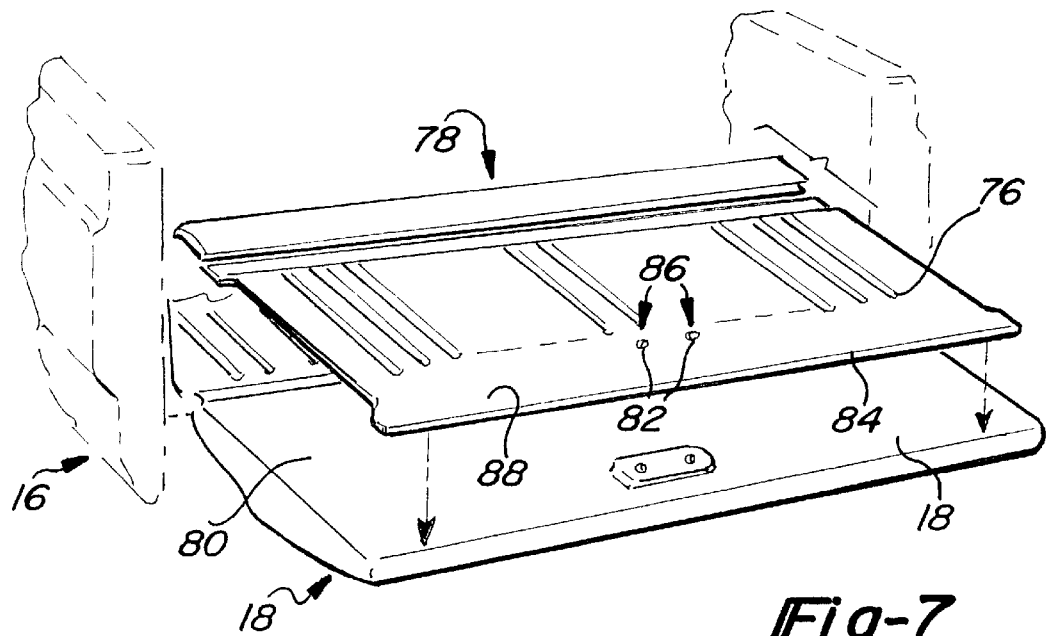
FIG. 7 is an exploded perspective view of a tailgate panel and panel holder in accordance with the invention.

As best shown in FIG. 1, an improved truck bed liner 10 for mounting in a truck bed of a pickup truck 12 is there shown. Although an in-the-rail truck bed liner is shown, the invention is suitable for use with other liners, such as an "over-the-rail" liner. The truck 12 has a cab 14, a truck bed 16 and a tailgate 18 (FIG. 6). The truck bed liner 10 has a front wall 20 and a pair of side walls 22 extending upwardly from a bottom 24. The bottom 24 is formed with a plurality of longitudinally disposed U-shaped ribs 26 and grooves 28. The ribs are formed with an equal, predetermined spacing "a" between longitudinal centers "c" of adjacent pairs of ribs 26. The liner 10 is formed of a suitable moldable material by vacuum molding and has a predetermined thickness of approximately ³⁄₁₆".

As best shown in FIGS. 1 and 2, the front wall 20 has an indicia mounting portion 30 for mounting an indicia plate 32. The mounting portion 30 is spaced downwardly from a center rail portion 34. The indicia mounting portion 30 includes a generally rectangular mounting surface 36 bordered at a peripheral edge by a generally U-shaped frame portion 38. The mounting surface is generally planar and is formed to have the dimensions of a typical license plate, such as 6"×12".

Four dimples 40 or indentations are positioned in the indicia mounting portion to facilitate the mounting of the indicia plate 32 by insertion of fasteners 42. The dimples 40 are formed to extend forwardly towards the cab 14 and are positioned to correspond with the mounting apertures 43 of the indicia plate 32.

As shown in FIGS. 2 and 5, a manufacturer's indicia 44 may be molded into the indicia mounting portion 30. The indicia 44 is formed by molding lettering or a design to protrude inwardly towards the cab 14. The indicia 44 is formed to extend inwardly in order to leave a generally flat surface for mounting of the indicia plate 32.

As shown in FIG. 2, the frame portion 38 is formed to extend continuously about the outer edges of the mounting surface 36 and has a generally U-shaped cross section. The frame 38 extends outwardly from the cab 14 and has the appearance of a license plate holder on an automobile. The frame has a pair of spaced apart side portions 46 extending between an upper and lower portion 48, 50. The indicia plate 32 is similar to an automobile license plate and may be formed of plastic or metal. The name or logo of the dealer may be formed on the plate 32. Alternatively, one of a number of commercially plates bearing messages, slogans or graphic designs may be mounted to the liner. Four apertures 43 are positioned near a peripheral edge 52 for mounting by the fasteners 42 to the mounting surface 36.

Friction strips 52 as shown in FIGS. 1 and 3 have a T-shaped cross-section and are formed of a material having a high coefficient of friction, such as synthetic rubber. The friction strips 52 have an upper portion 54 with an outwardly curved top surface 56 and a U-shaped plug portion 58 extending downwardly from the top portion 54. The plug portion 58 may be in the form of a channel as shown in FIG. 3. The plug 58 has a pair of side walls 60 spaced apart a width slightly greater than the width between the ribs 26 of the bottom 24 of the liner to fit tightly between the ribs 26 to hold the friction strip 52 in place. The friction strip 52 is pushed into the channel until an underside 59 of the top portion 54 abuts the ribs 26. The upper portion 54 has a width less than the distance "a" between the longitudinal center "c" of two adjacent ribs 26. In this way, several friction strips 52 may be inserted in adjacent grooves 28 of the bed liner side by side, as shown in FIG. 1. The top surface 56 may be curved outwardly to support the load of cargo as shown in FIG. 3.

Alternatively, as shown in FIG. 4, a friction strip 62 may be formed having two or more plugs 58 extending in a spaced apart parallel relationship beneath an upper portion 64 so that the friction strip 62 extends transversely across the bottom to provide a friction barrier across the full width of the liner 10.

As shown in FIG. 1, the friction strips 52 may be formed in relatively short lengths, such as 6 inches, and positioned wherever desired within the truck bed liner or may be formed as a long friction strip 66 which extends virtually the full length of the truck bed liner.

As show in FIG. 6, a friction strip 67 may be alternatively formed with a plug 68 having a plurality of spaced apart bars 70 which extend outwardly from the side walls 72 to firmly engage the ribs 26 of the bottom.

Figure 8:
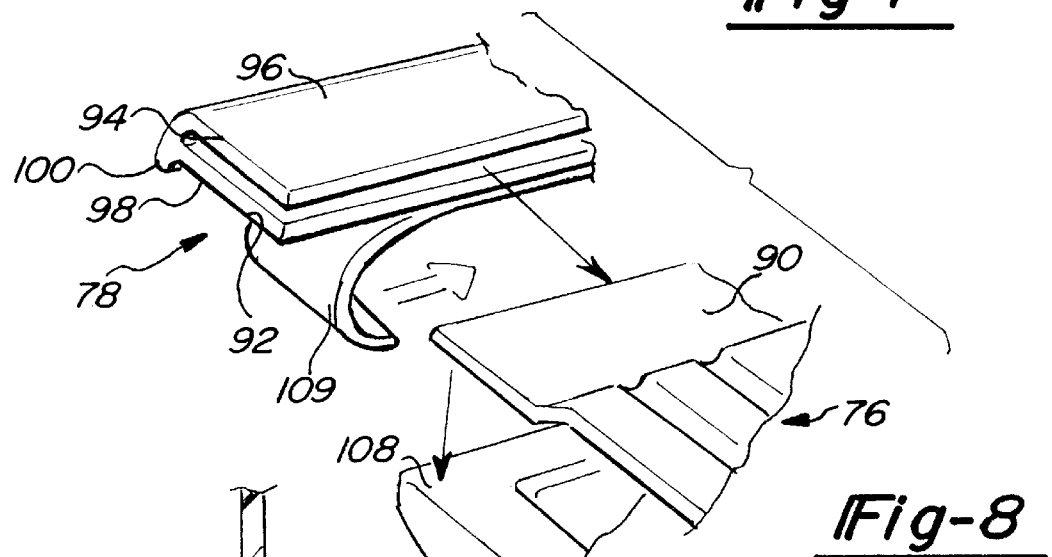
FIG. 8 is an exploded partial view of the panel holder, panel and tailgate.
Figure 9:
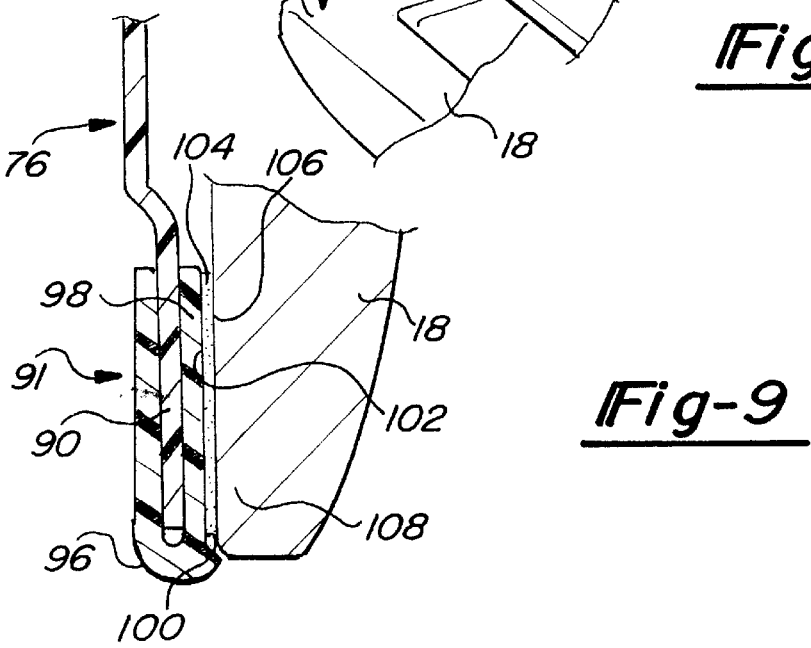
FIG. 9 is a partial cross-sectional view of the panel holder and panel in position on the tailgate.

As best shown in FIGS. 7, 8, and 9, a tailgate panel 76 is mounted to the tailgate 18 of the truck by a panel holder 78. The panel 76 is generally planar and extends across the inner surface 80 of the tailgate 18. The panel 18 has a pair of apertures 82 formed near a top edge 84 of the panel to receive threaded fasteners 86. The fasteners 86 are normally threaded into the inner surface 80 of the tailgate by the vehicle manufacturers. The fasteners 86 are removed and inserted through the apertures 82 in the panel 76 to secure an upper portion 88 of the panel 76 to the tailgate 18.

As shown in FIGS. 8 and 9, a lower portion 90 of the panel 76 is secured by the panel holder 78. The panel holder 78 is an elongated plastic extrusion body 91 having a pair of spaced apart arms 92, 94 extending from a connecting portion 96. The arms 92, 94 are spaced to slidably receive the lower portion 90 of the panel 76. The arms also permit contraction of the panel without distorting the shape.

The panel holder 78 has a planar surface 98 extending beneath the arm 92 and the connecting portion 96 to a downwardly extending flange 100. One side 102 of a double-sided adhesive tape strip 104 is affixed to the planar surface 98 and an other side 106 of the strip 104 is affixed along a bottom edge 108 of the tailgate 18 after a release sheet 109 is removed from the strip 104. The flange 100 extends the thickness of the strip 104 to provide a seal between the panel holder 78 and the tailgate 18 to prevent dirt and moisture from contacting the adhesive of the strip to reduce the holding ability of the strip.

Having described my invention, however, many modifications thereto may become apparent to those skilled in the art. These and other changes are within the spirit of the invention as defined by the scope of the appended claims.

I claim:

1. A liner for a truck bed of a vehicle also having a cab, said liner adapted for mounting an indicia plate, said liner comprising:

a body having a front wall and a pair of side walls extending from a bottom, said front wall having a frame portion and a generally planar mounting surface integrally formed in said front wall, said mounting surface having a periphery, said frame extending outwardly from said mounting surface in a direction away from said cab, said mounting surface having a graphic indentation portion extending in a direction towards said cab, said frame having an outer surface extending on a plane spaced apart and generally parallel to said mounting surface and having a pair of horizontally extending portions spaced apart on opposite sides of said periphery of said mounting surface; said frame also having a pair of spaced apart vertically extending portions; and means for mounting said indicia plate to said mounting surface.

2. The liner of claim 1, wherein said mounting surface is rectangular in shape and having a predetermined width and length slightly larger than a predetermined width and length of said indicia plate.

3. The liner of claim 1, said means for mounting including a plurality of spaced apart dimples formed on said mounting surface.

4. A panel holder for holding a panel for covering an inner surface of a tailgate, said panel holder comprising:

a body having a pair of spaced apart arms for slidingly receiving a portion of said panel, said arms extending from a connection portion, one of said arms having an outer surface; and a strip having a pair of spaced apart adhesive surfaces, one of said surfaces affixed to said outer surface of said arm and an other of said pair of surfaces adapted for mounting to said tailgate.

5. The panel holder of claim 4, wherein said strip has a predetermined thickness between said pair of adhesive surfaces and said body has a flange extending outwardly from said connecting portions a predetermined distance substantially equal to said predetermined thickness of said strip to form a seal with said tailgate.

* * * * *